United States Patent
Nomura et al.

(10) Patent No.: US 6,262,296 B1
(45) Date of Patent: Jul. 17, 2001

(54) POLYISOCYANATE PREPOLYMER

(75) Inventors: Takeshi Nomura; Takeshi Koyama; Yutaka Kono, all of Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/549,545

(22) Filed: Apr. 14, 2000

(30) Foreign Application Priority Data

Apr. 15, 1999 (JP) .................................................. 11-107986

(51) Int. Cl.⁷ ...................... C07C 271/24; C07C 271/34; C07C 271/32; C07C 271/10; C08G 18/75
(52) U.S. Cl. ................. 560/115; 252/182.2; 252/182.22; 528/59; 528/67; 528/76; 528/85; 560/330; 560/355; 560/158; 560/162; 560/166
(58) Field of Search .................. 528/59, 67, 76, 528/85; 560/115, 330, 355, 158, 162, 166; 252/182.22, 182.2

(56) References Cited

U.S. PATENT DOCUMENTS

| | | | |
|---|---|---|---|
| 3,909,466 | 9/1975 | Matsui et al. | 161/190 |
| 4,395,529 * | 7/1983 | Panandiker et al. | 528/45 |
| 4,443,597 * | 4/1984 | Kamatani et al. | 544/67 |
| 4,603,181 * | 7/1986 | Nishino et al. | 525/528 |
| 4,731,415 * | 3/1988 | Fujita et al. | 525/123 |
| 4,880,890 | 11/1989 | Miyabayashi et al. | 528/45 |
| 5,066,757 * | 11/1991 | Miyabayashi et al. | 528/45 |

FOREIGN PATENT DOCUMENTS

| | | |
|---|---|---|
| 1-268769 | 10/1989 | (JP) . |
| 3-140364 | 6/1991 | (JP) . |
| 3-247617 | 11/1991 | (JP) . |
| 5-17553 | 1/1993 | (JP) . |
| 6-172483 | 6/1994 | (JP) . |
| 6-172484 | 6/1994 | (JP) . |
| 7-278247 | 10/1995 | (JP) . |
| 7-304724 | 11/1995 | (JP) . |
| 10-102406 | 4/1998 | (JP) . |
| 10-168155 | 6/1998 | (JP) . |

* cited by examiner

*Primary Examiner*—Rabon Sergent
(74) *Attorney, Agent, or Firm*—Armstrong, Westerman, Hattori, McLeland & Naughton, LLP

(57) ABSTRACT

A polyisocyanate prepolymer with isocyanate group on terminal obtainable by reaction of (A) polyoxyalkylenepolyol, (B) polyhydric alcohol having a molecular weight of 90 to 250 and the number of hydroxyl group of 2 to 3 with branched alkyl group and/or cyclohexane ring and (C) organic polyisocyanate composed of bis(isocyanatemethyl)cyclohexane, wherein NCO group content in the polyisocyanate prepolymer is 8% by weight or above and urethane group content in the polyisocyanate prepolymer is 8% by weight or above and sum total of NCO group content and urethane group content is 16 to 30% by weight and a concentration of unreacted (C) organic polyisocyanate remained in the polyisocyanate prepolymer is 1% by weight or below.

4 Claims, No Drawings

POLYISOCYANATE PREPOLYMER

BACKGROUND OF THE INVENTION

1) Field on the Invention

The present invention relates to a polyisocyanate prepolymer with excellent weather resistance, high strength, excellent mechanical properties including flexibility and elongation, good curing, low viscosity and high security which is useful to various sealing materials, water proof agents, coating materials, coating agents, adhesives and paving materials, particularly to a one-liquid type moisture curing polyisocyanate prepolymer.

2) Prior Art

Hitherto, polyurethane has been used in a wide range since it exhibits excellent water resistance, excellent chemical resistance, good adhesion to a substrate and excellent mechanical properties in various sealing materials, water proof agents, coating materials, coating agents; adhesives and paving materials.

Polyurethane has been used in a wide range as so-called two-liquid type polyurethane composition in which reaction cure is usually performed by mixing main ingredient with a curing agent. However, use of such composition causes troubles in handling due to mixing of two liquid. Thus, recently, one-liquid type moisture curing polyurethane compositions in which troubles in handling due to mixing of two liquids have been overcome, e.g., as described in Japanese Patent Kokai (Laid-open) No. 57-94056, a polyurethane composition to cure a polyisocyanate prepolymer having NCO group on terminal with moisture in the atmosphere have been increased.

However, conventional one-liquid type moisture curing polyisocyanate prepolymer exhibits poor curing property in which its cured surface after moisture curing grows sticky over a long time to adhere dusts to contaminate its surface and furthermore does not provide satisfactory mechanical properties and its weather resistance also is insufficient. Usually, aromatic polyisocyanate has been used.

Thus, in order to improve contamination of surface, mechanical properties and weather resistance, various researches and developments directed to one-liquid type moisture curing polyisocyanate prepolymer have been performed. For example, Japanese Patent Kokai (Laid-open) No. 1-268769 discloses a moisture curing type polyol modified isocyanate composition obtained by reaction of long chain polyol having the number of functional group of 2 and an average molecular weight of 500 to 6000 and short chain polyol having the number of functional group to 2 to 8 and an average molecular weight of 62 to 400 and polyisocyanate. Japanese Patent Kokai (Laid-open) No. 3-247617 discloses a moisture curing polyurethane composition with isocyanate group on terminal composed of long chain polyol, linear chain aliphatic glycol having a molecular weight of 62 to 300 and organic polyisocyanate. However, aforementioned prior arts has not yet attained to uncontamination of surface and satisfactory mechanical properties and weather resistance is yet insufficient.

Japanese Patent Kokai (Laid-open) No. 5-17553 discloses a moisture curing type urethane composition comprising urethane prepolymer obtained by reaction of monool having the number of hydroxyl group of 1 and a number average molecular weight of 350 or above, polyol and organic polyisocyanate. Japanese Patent Kokai (Laid-open) No. 3-140364 discloses a thermoplastic type polyurethane prepolymer obtainable by reaction of diol and organic diisocyanate. Japanese Patent Kokai (Laid-open) No. 7-278247 discloses a moisture curing urethane composition comprising urethane prepolymer obtainable by reaction of (meth) acrylic compound having the number of hydroxyl group of 1 to 3 or oligomer thereof, polyol and organic polyisocyanate. Aforementioned prior arts also do not provide satisfactory weather resistance.

Japanese Patent Kokai (Laid-open) No. 10-168155 discloses a polyisocyanate composition containing allophanate bond obtainable by reaction of aliphatic and/or alicyclic diisocyanate and polyol having a molecular weight of 6,000 to 30,000 (except acrylpolyol), but storage stability of reaction liquid has not sufficiently considered since various catalysts are used in the reaction in order to promote allophanate bonding and furthermore curing property, particularly curing velocity is very small since the molecular weight of polyol to be used is high and also improvement of mechanical properties is insufficient.

Likewise, Japanese Patent Kokai (Laid-open) No. 7-304724 discloses a process for producing a polyisocyanate having allophanate group and isocyanate group bonded to aliphatic and/or alicyclic radical by reacting an organic compound containing urethane group with organic polyisocyanate containing isocyanate group bonded to aliphatic and/or alicyclic radical in the presence of a tin compound, but storage stability of reaction product becomes very unstable since the tin compound is used as catalyst for the reaction.

Japanese Patent Kokai (Laid-open) No. 6-172483 discloses a moisture curing composition composed of a mixture of a copolymer of meta-isopropenyl-α,α-dimethylbenzilisocyanate, (meth)acrylic monomer and other monomer and a specific polyisocyanate compound and Japanese Patent Kokai (Laid-open) No. 6-172484 discloses a moisture curing composition composed of a mixture of a copolymer of meta-isopropenyl-α,α-dimethylbenzilisocyanate with unsaturated monomer including (meth)acrylate and a specific polyisocyanate compound and Japanese Patent Kokai (Laid-open) No. 10-102406 discloses a composition for elastic paving material comprising a rubber powdery substance, a monomer including (meth)acrylate and unchangeable to yellowness type organic (poly)isocyanate, but in the prior arts using acrylic compound, working efficiency is remarkably worsened since curing velocity is very small and cured substance thus obtained does not obtain satisfactory flexibility and elongation.

Japanese Patent Kokai (Laid-open) No. 62-252416 discloses a process for producing an oligourethane containing free isocyanate by reacting organic diisocyanate, macropolyol having a molecular weight of 500 to about 10,000 and low molecular weight branched polyol having a molecular weight of 62 to 499. Even when low molecular weight branched polyol is used, uncontamination of surface and satisfactory mechanical properties cannot be obtained and aforementioned prior art does not sufficient weather resistance.

As described above, various researches and developments directed to one-liquid type moisture curing polyisocyanate prepolymer has been performed. However, under the present situation, polyisocyanate prepolymer with excellent weather resistance, high strength, excellent mechanical properties including flexibility and elongation and good curing is not yet obtained.

SUMMARY OF THE INVENTION

An object of the present invention is to provide a polyisocyanate prepolymer with excellent weather resistance, high strength, excellent mechanical properties, good curing, low viscosity and high security which is useful to various sealing materials, water proof agents, coating materials, coating agents, adhesives and paving materials, particularly a one-liquid type moisture curing polyisocyanate prepolymer.

As a result of extensive studies for polyisocyanate prepolymer to solve aforementioned prior art problems, the inventors have found that a polyisocyanate prepolymer with excellent weather resistance, high strength, excellent mechanical properties including flexibility and elongation and good curing can be obtained by specifying isocyanate group (sometimes, abbreviated as "NCO group") content and urethane group content in the polyisocyanate prepolymer and total thereof to a specified range and introducing a specific alcohol unit into the polyisocyanate prepolymer and using a specific organic polyisocyanate, and have accomplished the present invention.

That is, the present invention provides a polyisocyanate prepolymer with isocyanate group on terminal obtainable by reaction of (A) polyoxyalkylenepolyol, (B) polyhydric alcohol and (C) organic polyisocyanate, wherein:

(1) NCO group content in the polyisocyanate prepolymer is 8% by weight or above and urethane group content in the polyisocyanate prepolymer is 8% by weight or above and sum total of NCO group content and urethane group content is 16 to 30% by weight, (2) (B) polyhydric alcohol has a molecular weight of 90 to 250 and the number of hydroxyl group of 2 to 3 and is an alcohol with branched alkyl group and/or cyclohexane ring, (3) (C) organic polyisocyanate is bis(isocyanatemethyl) cyclohexane, and (4) a concentration of unreacted (C) organic polyisocyanate remained in the polyisocyanate prepolymer is 1% by weight or below.

DETAILED DESCRIPTION OF THE INVENTION

The present invention will be described in detail below.

Examples of (A) polyoxyalkylenepolyol include products obtainable by addition polymerization of polyfunctional aliphatic glycols such as ethylene glycol, diethylene glycol, propylene glycol, dipropylene glycol, neopentyl glycol, glycerine, trimethylol propane, glucose, sorbitol and sucrose with ethylene oxide, propylene oxide, butylene oxide, etc., and products obtainable by ring-opening polymerization of tetrahydrofuran.

The average molecular weight of (A) polyoxyalkylenepolyol is determined according to measurement of terminal hydroxyl group equivalent in which a method of measurement of hydroxyl group equivalent described later and properly decided considering various performances including mechanical properties and curing property of obtained polyisocyanate prepolymer. The average molecular weight of (A) polyoxyalkylenepolyol is usually 200 to 6000 and preferably 300 to 3000. A mixture of two species or above of polyoxyalkylenepolyol having a different average molecular weight to each other or a mixture of polyoxyalkylenepolyols with different number of functional group to each other may be used.

The (B) polyhydric alcohol has a molecular weight of 90 to 250, the number of hydroxyl group to 2 to 3 and branched alkyl group and/or cyclohexane ring. Examples of (B) polyhydric alcohol include 2-methyl-1,3-propanediol, neopentyl glycol, 2-methyl-1,4-butandiol, 2,2-dimethyl-1,4-butanediol, 2,3-dimethyl-1,4-butandiol, 2-methyl-1,5-pentanediol, 2,2-dimethyl-1,5-pentandiol, 2,3-dimethyl-1,5-pentanediol, 3-methyl-1,5-pentanediol, 3,3-dimethyl-1,5-pentanediol, 2,4-dimethyl-1,5-pentanediol, trimethylolpropane, 1,3-cyclohexanedimethanol, 1,4-cyclohexanedimethanol and hydrogenated bisphenol A. As (B) polyhydric alcohol, a mixture of two species or above of alcohol having a different molecular weight to each other or a mixture of alcohols with different number of functional group to each other may be used. Use of linear aliphatic glycol causes disadvantages that curing of polycisocyanate prepolymer becomes bad and mechanical properties including tensile strength and elastic constant after curing are extremely deteriorated and weather resistance, particularly, maintenance of mechanical properties is extremely degraded.

Further, when molecular weight of (B) polyhydric alcohol is above 250, mechanical properties including tensile strength and elastic constant after curing in obtained polyisocyanate prepolymer are extremely degraded.

As (C) organic polyisocyanate, bis(isocyanatemethyl) cyclohexane as unchangeable to yellowness type polyisocyanate is used. As bis(isocyanatemethyl)cyclohexane, 1,3-bis(isocyanatemethyl)cyclohexane, 1,4-bis (isocyanatemethyl)cyclohexane or a mixture thereof is suitably used. It is preferable that bis(isocyanatemethyl) cyclohexane does not substantially contain halogen. The recitation "not substantially contain halogen" in the present invention means that halogen element content is 20 ppm or below in both halogen with inorganic property and halogen with organic property.

The (C) organic polyisocyanate may be produced in any process. However, conventional organic polyisocyanates to be industrially produced contain a large amount of halogen since they are produced using phosgene. Thus, it is very difficult to produce organic polyisocyanate which does not substantially contain halogen.

Therefore, it is preferable to obtain (C) organic polyisocyanate which does not substantially contain halogen, for example, by pyrolysis of the corresponding urethane compound (e.g., Japanese Patent Kokai(Laid-open) Nos. 50-30832 and 60-231640). Examples of the process for producing urethane compound, as referred to "Chemtech" November, P670–675, 1984, include a process comprising oxidatively reacting a diamino compound with carbon monoxide and an organic hydroxyl compound, a process comprising reductively reacting a dinitro compound, a dinitroso compound, an azo compound or an azoxy compound with carbon monoxide and an organic hydroxyl compound, a process comprising reacting a diamino compound with a dialkyl carbonate or a diaryl carbonate (e.g., Japanese Patent Kokai (Laid-open) Nos. 63-162662 and 1-230550) and a process comprising reacting a diamino compound with urea and an organic hydroxyl compound (e.g., Japanese Patent Kokai (Laid-open) Nos. 63-232278 and 1-14218). As other process for producing an isocyanate compound which does not substantially contain halogen, there are various processes including a process obtainable directly from a diamino compound and a diaryl carbonate (e.g., Japanese Patent Kokai (Laid-open) No. 62-149654).

In the present invention, it is very important to use a specific polyisocyanate compound, i.e., bis (isocyanatemethyl)cyclohexane irrespective of presence of halogen atom as (C) organic polyisocyanate. In order to ensure excellent weather resistance, it is considered that it is effective to use aliphatic polyisocyanate or alicyclic polyisocyanate. However, when aliphatic polyisocyanate, particularly bifunctional aliphatic polyisocyanate is used, obtained cured substance does not exhibit good mechanical properties including tensile strength and elastic constant and its weather resistance, particularly, maintenance of mechanical properties is extremely degraded since cured substance is further softened. Further, when other alicyclic polyisocyanate, particularly alicyclic polyisocyanate bonded NCO group directly to cyclohexane ring such as isophorone diisocyanate is used, curing of obtained polyisocyanate prepolymer is remarkably deteriorated since reactivity of the alicyclic polyisocyanate is very low and obtained cured substance does not exhibit good mechanical properties, particularly good elongation performance since it is very hard and exhibits poor flexibility and poor elongation and furthermore its weather resistance, particularly maintenance of mechanical properties, is extremely degraded due to further curing shrinkage of the cured substance.

On the other hand, the polyisocyanate prepolymer obtained by using a specific polyisocyanate compound, i.e., bis(isocyanatemethyl)cyclohexane to be used in the present invention has a low viscosity and exhibits excellent weather resistance, high strength, excellent mechanical properties including flexibility and elongation and good curing. Moreover, lowering of viscosity, weather resistance and mechanical properties are further improved by using bis (isocyanatemethyl)cyclohexane which does not substantially contain halogen.

In the present invention, NCO group content in polyisocyanate prepolymer is 8% by weight or above and urethane group content in polyisocyanate prepolymer is 8% by weight or above and sum total of NCO group content and urethane group content is 16 to 30% by weight.

The "NCO group content [% by weight]" herein represents a proportion (percentage) of NCO group which is present in polyisocyanate prepolymer with NCO group on terminal with a concentration of unreacted (C) organic polyisocyanate of 1% by weight or below and determined according a method which is described later.

The "urethane group content [% by weight]" herein represents a proportion (percentage) of urethane group which is present in polyisocyanate prepolymer with NCO group on terminal with a concentration of unreacted (C) organic polyisocyanate of 1% by weight or below and calculated from the following formula.

Urethane group content[(% by weight]=urethan group concentration [equivalent/g]×59.02×100

59.02=mass per 1 equivalent of urethan group
Urethane group concentration [equivalent/g]=(sum total of hydroxyl group equivalent of charged (A) polyoxyalkylenepolyol and charged (B) poyhydric alcohol having a molecular weight of 90 to 250 and the number of hydroxyl group of 2 to 3)/(weight of polyisocyanate prepolymer with a concentration of unreacted (C) polyisocyanate of 1% by weight or below)

Hydroxyl group equivalent is determined according a method which is described later.

When NCO group content or urethane group content is below 8% by weight, mechanical properties including tensile strength and elastic constant of obtained polyisocyanate prepolymer are extremely deteriorated and furthermore curing becomes extremely slow at a low temperature and a low humidity, particularly in winter since absorption of moisture in the atmosphere during curing becomes small. When sum total of NCO group content and urethane group content is above 30% by weight, working efficiency is worsened since viscosity of obtained polyisocyanate prepolymer is extremely increased and mechanical properties including elongation and flexibility are extremely deteriorated and extreme foaming phenomenon occurs in obtained polyisocyanate prepolymer since absorption of moisture in the atmosphere during curing becomes extremely large.

The viscosity of polyisocyanate prepolymer to provide good working efficiency is 8,000 mPa·s @25° C. or below and preferably 5,000 mPa·s @25° C. or below according to JIS K 5400. The lower the viscosity is, the better. In order to maintain good properties, the viscosity is sacrificed to some degree. It becomes necessary that the viscosity of polyisocyanate prepolymer is 1,000 mPa·s @ 25° C. or above.

The polyisocyanate prepolymer with isocyanate group on terminal of the present invention is obtained by reaction of (A) polyoxyalkylenepolyol, (B) polyhydric alcohol and (C) organic polyisocyanate in an equivalent ratio of isocyanate group equivalent/hydroxyl group equivalent of usually 2/1 to 50/1 and preferably 4/1 to 2011. The ratio of isocyanate group equivalent/hydroxyl group equivalent is determined according to methods which are described later. Aforementioned hydroxyl group equivalent is an equivalent of total hydroxyl group of (A) polyoxyalkylenepolyol and (B) polyhydric alcohol.

Regarding the reaction process, sequent order of adding aforementioned each component is not limited, All quantity of each component is mixed one after another or at the same time or if necessary, (C) organic polyisocyanate is again suitably added in the course of the reaction. Thus, conventional various processes in the art can be applied to the process of the present invention.

When the ratio of isocyanate group equivalent/hydroxyl group equivalent is below 2/1, urethane group content in obtained polyisocyanate prepolymer is extremely increased and its viscosity is remarkably increased since molecular weight distribution is extremely widened. When the ratio is above 50/1, it is not preferable since the yield of obtained polyisocyanate prepolymer is lowered.

If necessary, organic solvent may be used during the reaction. Examples of the organic solvent include toluene, xylene, ethyl acetate, butyl acetate, methyl ethyl ketone, methyl isobutyl ketone and cellosolve acetate.

In the present invention, the concentration of unreacted (C) organic polyisocyanate remained in polyisocyanate is 1% by weight or below. This is attained by reacting (A) polyoxyalkylenepolyol, (B) polyhydric alcohol and (C) organic polyisocyanate and then removing unreacted (C) organic polyisocyanate and organic solvent with an industrial separator such a film evaporator and an extractor.

The polyisocyanate prepolymer of the present invention is changed from a substance designated as poison in classification to a resin and comes to be out of designation of poison according to classification of the United Nations, by maintaining a concentration of unreacted (C) organic polyisocyanate to 1% by weight or below. The inventors have found that also the problem of foaming phenomena during curing remained unsettled in execution of works can be solved by maintaining a concentration of unreacted (C) organic polyisocyanate to 1% by weight or below in the polyisocyanate prepolymer, considering security.

When the polyisocyanate prepolymer of the present invention is applied to various uses, if necessary, organic solvent, inorganic filler, plasticizer, thixotropy agent, etc., are added. Further, although the polyisocyanate prepolymer of the present invention alone exhibits satisfactory weather resistance, if necessary, ultraviolet absorbent, antioxidant, etc., may be added. Although the polyisocyanate prepolymer is sufficiently cured, if necessary, cure promoting agent may be added.

Examples of aforementioned organic solvent include conventional solvents for urethane such as toluene, xylene, ethyl acetate, butyl acetate, methyl ethyl ketone, methyl isobutyl ketone and cellosolve acetate.

Examples of the inorganic filler include carbon black, calcium carbonate, talc, clay, silica and titanium oxide.

Examples of the plasticizer include conventional plasticizers such as process oil, dioctyl phthalate, dibutyl phthalate and dinonyl phthalate. The process oil is a conventional high boiling oil obtainable in petroleum refining.

Examples of the thixotropy agent include polyvinyl chloride powder, fine powdery silica and bentonite.

Examples of the cure promoting agent include known organic metal compounds including lead and tin compound and tertiary amine.

PREFERRED EMBODIMENT OF THE INVENTION

The present invention will be described in more detail below, referring to Examples, Comparative Examples, Production Examples and Test Examples which are not intended to limit the scope of the present invention. The words "part" and "%" in Examples, Comparative Examples and Production Examples mean weight basis.

The measurement and evaluation of each property in Examples, Comparative Examples, Production Examples and Test Examples were performed according to the following methods.

[Determination of NCO Group Content in Polyisocyanate Prepolymer]

0.5 to 1 g of polyisocyanate prepolymer sample was accurately weighed. 7 ml of a 1 N toluene solution of dibutylamine was in drop wise added to weighed polyisocyanate prepolymer sample to preform urea reaction. Unreacted dibutylamine was titrated with ½ N hydrochloric acid, whereby NCO group content [% by weight] was determined.

[Determination of Hydroxyl Group (OH) Equivalent]

Several g of (A) polyoxyalkylenepolyol sample or sample containing both (A) polyoxyalkylenepolyol and (B) polyhydric alcohol was weighted and then an acetylating reagent containing acetic anhydride was added thereto to perform reaction with heating at 85° C. Hydroxyl group reacted acetic anhydride to form acetate. Unreacted acetic anhydride was hydrolyzed with a pyridine-water mixed liquid to change into acetic acid. Acetic acid thus produced was titrated with a ½ N potassium hydroxide ethanol solution, whereby hydroxyl group equivalent was determined.

[Determination of Ratio of Isocyanate Group Equivalent/ hydroxyl Group Equivalent]

The determination was performed in the same method as in that of NCO group content except that (C) organic polyisocyanate sample to be reacted was used instead of polyisocyanate prepolymer sample, whereby isocyanate group equivalent [unit: equivalent] was determined. Hydroxyl group equivalent [unit: equivalent] was determined by abovementioned method.

[Measurement of Concentration of Unreacted (C) Organic Polyisocyanate Remained in Polyisocyanate Prepolymer with Isocyanate Group on Terminal]

The measurement was performed by gel permeation chromatography (GPC) with a measuring apparatus, GPC System 21 manufactured by Showa Denko k.k., Japan. GPC column was used, in which two columns of KF801 and each one column of KF802.5 and KF803L, manufactured by Showa Denko k.k., Japan were connected in series. Tetrahydrofuran as eluate was eluted at the rate of 1 ml/min. The column temperature was 40° C. The detector was a refractometer.

[Each Measurement of Tensile Strength, Elastic Constant and Elongation]

Each measurement was performed with a load cell, STROGRAPH V1-C, 100 kg, manufactured by (k.k.) Toko Seiki Seisakusho, Japan, in a room adjusted to 23° C. and 50% RH at a head speed of 200 mm/min according to JIS K 5400.

[Evaluation of Curing]

A testing resin film was prepared. It was evaluated whether perfect curing was performed in 5 hours after completion of preparation of the testing resin film and it was possible to make a test piece from the testing resin film according to JIS K6301.

○:Perfect curing*was performed and it was possible to make a test piece

×:It was impossible to make a test piece (a time when it became possible to make a test piece was measured).

*Perfect curing was based on JIS K 5400 Curing conditions: 23° C. and 50% RH, for 7 days

[Weather Resistance Test]

Accelerating test was performed for a test piece made from a resin film with a sun shine weather 0 meter according to JIS K5400. After accelerating test for 500 hours, both change of each mechanical properties including tensile strength, elastic constant and elongation of the test piece and change of yellowness index as colored degree of the test piece were The change of each mechanical properties was shown by percentage of (each measured value after test)/(each measured value before test (initial)×100 maintenance percentage of mechanical properties.

The change of yellowness index was shown by ΔYI= (yellowness index after test)−(yellowness index before test (initial).

[Measurement of Viscosity of Polyisocyanate Prepolymer]

The measurement was performed with a rotary viscometer according to JIS K5400.

EXAMPLE 1

4600 parts of bifunctional polypropylene glycol having an average molecular weight of 2000, 1200 parts of trifunctional polypropylene glycol having an average molecular weight of 300, 807 parts of neopentyl glycol and 30040 parts of 1,3-bis(isocyanatemethyl)cyclohexane with a halogen content of 2 ppm were charged into a four-neck flask, equipped with a stirrer, a thermometer, a reflux condenser and a dry nitrogen gas-introducing tube and the reaction was performed in a ratio of isocyanate group equivalent/ hydroxyl group equivalent of 9.6/1 at 130° C. for 6 hours in a nitrogen gas stream. Then, unreacted 1,3-bis (isocyanatemethyl)cyclohexane in the reaction product was distilled out with a falling type film evaporator, whereby a polyisocyanate prepolymer with isocyanate group on terminal was obtained. Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 1. The viscosity of the polyisocyanate prepolymer with isocyanate group on terminal was 3700 mPa·s @ 25° C. and working efficiency was very good.

EXAMPLE 2

157.3 parts of bifunctional polypropylene glycol having an average molecular weight of 2000, 41.4 parts of trifunctional polypropylene glycol having an average molecular weight of 300, 41.8 parts of neopentyl glycol and 1300 parts of 1,3-bis(isocyanatemethyl)cyclohexane with a halogen content of 2 ppm were charged into a four-neck flask, equipped with a stirrer, a thermometer, a reflux condenser and a dry nitrogen gas-introducing tube and the reaction was performed in a ratio of isocyanate group equivalent/hydroxyl group equivalent of 9.7/1 at 130° C. for 6 hours in a nitrogen gas stream. Then, unreacted 1,3-bis(isocyanatemethyl)cyclohexane in the reaction product was distilled out with a falling type film evaporator, whereby a polyisocyanate prepolymer with isocyanate group on terminal was obtained. Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 1. The viscosity of the polyisocyanate prepolymer with isocyanate group on terminal was 4600 mPa·s @ 25° C. and working efficiency was very good.

EXAMPLE 3

145.2 parts of bifunctional polypropylene glycol having an average molecular weight of 2000, 33.7 parts of bifunctional polypropylene glycol having an average molecular weight of 200, 60.0 parts of neopentyl glycol and 1600 parts of 1,3-bis(isocyanatemethyl)cyclohexane with a halogen content of 2 ppm were charged into a four-neck flask, equipped with a stirrer, a thermometer, a reflux condenser and a dry nitrogen gas-introducing tube and the reaction was performed in a ratio of isocyanate group equivalent/hydroxyl group equivalent of 10.1/1 at 130° C. for 6 hours in a nitrogen gas stream. Then, unreacted 1,3-bis(isocyanatemethyl)cyclohexane in the reaction product was distilled out with a falling type film evaporator, whereby a polyisocyanate prepolymer with isocyanate group on terminal was obtained. Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 1. The viscosity of the polyisocyanate prepolymer with isocyanate group on terminal was 5100 mPa·s @ 25° C. and working efficiency was good.

EXAMPLE 4

150.6 parts of bifunctional polypropylene glycol having an average molecular weight of 2000, 39.3 parts of trifunctional polypropylene glycol having an average molecular weight of 300, 26.0 parts of hydrogenated bisphenol A and 700 parts of 1,3-bis(isocyanatemethyl)cyclohexane with a halogen content of 2 ppm were charged into a four-neck flask, equipped with a stirrer, a thermometer, a reflux condenser and a dry nitrogen gas-introducing tube and the reaction was performed in a ratio of isocyanate group equivalent/hydroxyl group equivalent of 9.5/1 at 130° C. for 6 hours in a nitrogen gas stream. Then, unreacted 1,3-bis(isocyanatemethyl)cyclohexane in the reaction product was distilled out with a falling type film evaporator, whereby a polyisocyanate prepolymer with isocyanate group on terminal was obtained. Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 1. The viscosity of the polyisocyanate prepolymer with isocyanate group on terminal was 5500 mPa·s @ 25° C. and working efficiency was good.

EXAMPLE 5

150.6 parts of bifunctional polypropylene glycol having an average molecular weight of 2000, 39.3 parts of trifunctional polypropylene glycol having an average molecular weight of 300, 9.7 parts of trimethylolpropane and 700 parts of 1,3-bis(isocyanatemethyl)cyclohexane with a halogen content of 2 ppm were charged into a four-neck flask, equipped with a stirrer, a thermometer, a reflux condenser and a dry nitrogen gas-introducing tube and the reaction was performed in a ratio of isocyanate group equivalent/hydroxyl group equivalent of 9.5/1 at 130° C. for 6 hours in a nitrogen gas stream. Then, unreacted 1,3-bis(isocyanatemethyl)cyclohexane in the reaction product was distilled out with a falling type film evaporator, whereby a polyisocyanate prepolymer with isocyanate group on terminal was obtained. Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 2. The viscosity of the polyisocyanate prepolymer with isocyanate group on terminal was 4500 mPa·s @ 25° C. and working efficiency was very good.

EXAMPLE 6

53.4 parts of bifunctional polypropylene glycol having an average molecular weight of 2000, 13.9 parts of trifunctional polypropylene glycol having an average molecular weight of 300, 13.0 parts of cyclohexanedimethanol and 350 parts of 1,3-bis(isocyanatemethyl)cyclohexane with a halogen content of 2 ppm were charged into a four-neck flask, equipped with a stirrer, a thermometer, a reflux condenser and a dry nitrogen gas-introducing tube and the reaction was performed in a ratio of isocyanate group equivalent/hydroxyl group equivalent of 9.6/1 at 130° C. for 6 hours in a nitrogen gas stream. Then, unreacted 1,3-bis(isocyanatemethyl)cyclohexane in the reaction product was distilled out with a falling type film evaporator, whereby a polyisocyanate prepolymer with isocyanate group on terminal was obtained.

Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 2. The viscosity of the polyisocyanate prepolymer with isocyanate group on terminal was 4000 mPa·s @ 25° C. and working efficiency was very good.

EXAMPLE 7

66.8 parts of bifunctional polypropylene glycol having an average molecular weight of 2000, 17.4 parts of trifunctional polypropylene glycol having an average molecular weight of 300, 11.7 parts of neopentyl glycol and 350 parts of 1,3-bis(isocyanatemethyl)cyclohexane with a hydrolyzable chlorine content of 254 ppm (containing acidic HCl of 40 ppm) were charged into a four-neck flask, equipped with a stirrer, a thermometer, a reflux condenser and a dry nitrogen gas-introducing tube and the reaction was performed in a ratio of isocyanate group equivalent/hydroxyl group equivalent of 7.7/1 at 130° C. for 6 hours in a nitrogen gas stream. Then, unreacted 1,3-bis(isocyanatemethyl)cyclohexane in the reaction product was distilled out with a falling type film evaporator, whereby a polyisocyanate prepolymer with isocyanate group on terminal was obtained. Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 2. The viscosity of the polyisocyanate prepolymer with isocyanate group on terminal was 4300 mPa·s @ 25° C. and working efficiency was very good.

Comparative Example 1

215.2 parts of bifunctional polypropylene glycol having an average molecular weight of 2000, 56.2 parts of trifunctional polypropylene glycol having an average molecular weight of 300 and 700 parts of 1,3-bis(isocyanatemethyl)cyclohexane with a halogen content of 2 ppm were charged into a four-neck flask, equipped with a stirrer, a thermometer, a reflux condenser and a dry nitrogen gas-introducing tube and the reaction was performed in a ratio of isocyanate group equivalent/hydroxyl group equivalent of 9.3/1 at 130° C. for 6 hours in a nitrogen gas stream. Then, unreacted 1,3-bis(isocyanate-methyl)cyclohexane in the reaction product was distilled out with a falling type film evaporator, whereby a polyisocyanate prepolymer with isocyanate group on terminal was obtained. Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 3. The viscosity of the polyisocyanate prepolymer with isocyanate group on terminal was 2500 mPa·s @ 25° C. and working efficiency was very good.

Comparative Example 2

42.7 parts of bifunctional polypropylene glycol having an average molecular weight of 2000, 11.3 parts of trifunctional polypropylene glycol having an average molecular weight of 300, 30.1 parts of neopentyl glycol and 700 parts of 1,3-bis(isocyanatemethyl)cyclohexane with a halogen content of 2 ppm were charged into a four-neck flask, equipped with a stirrer, a thermometer, a reflux condenser and a dry nitrogen gas-introducing tube and the reaction was performed in a ratio of isocyanate group equivalent/hydroxyl group equivalent of 9.8/1 at 130° C. for 6 hours in a nitrogen gas stream. Then, unreacted 1,3-bis(isocyanatemethyl)cyclohexane in the reaction product was distilled out with a falling type film evaporator, whereby a polyisocyanate prepolymer with isocyanate group on terminal was obtained. Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 3. The viscosity of the polyisocyanate prepolymer with isocyanate group on terminal was 7600 mPa·s @ 25° C. and working efficiency was bad.

Comparative Example 3

53.4 parts of bifunctional polypropylene glycol having an average molecular weight of 2000, 13.9 parts of trifunctional polypropylene glycol having an average molecular weight of 300, 6.9 parts of 1,3-propanediol and 350 parts of 1,3-bis(isocyanatemethyl)cyclohexane with a halogen content of 2 ppm were charged into a four-neck flask, equipped with a stirrer, a thermometer, a reflux condenser and a dry nitrogen gas-introducing tube and the reaction was performed in a ratio of isocyanate group equivalent/hydroxyl group equivalent of 9.7/1 at 130 for 6 hours in a nitrogen gas stream. Then, unreacted 1,3-bis(isocyanatemethyl)cyclohexane in the reaction product was distilled out with a falling type film evaporator, whereby a polyisocyanate prepolymer with isocyanate group on terminal was obtained. Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 3. The viscosity of the polyisocyanate prepolymer with isocyanate group on terminal was 6600 mPa·s @ 25° C. and working efficiency was bad.

Comparative Example 4

58.3 parts of bifunctional polypropylene glycol having an average molecular weight of 2000, 15.2 parts of trifunctional polypropylene glycol having an average molecular weight of 300, 10.2 parts of neopentyl glycol and 350 parts of isophoronediisocyanate (IPDI) were charged into a four-neck flask, equipped with a stirrer, a thermometer, a reflux condenser and a dry nitrogen gas-introducing tube and the reaction was performed in a ratio of isocyanate group equivalent/hydroxyl group equivalent of 7.8/1 at 130° C. for 8 hours in a nitrogen gas stream. Then, unreacted 1,3-bis (isocyanate-methyl)cyclohexane in the reaction product was distilled out with a falling type film evaporator, whereby a polyisocyanate prepolymer with isocyanate group on terminal was obtained. Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 4. The viscosity of the polyisocyanate prepolymer with isocyanate group on terminal was 22000 mPa·s @ 25° C. and working efficiency was very bad.

Comparative Example 5

74.9 parts of bifunctional polypropylene glycol having an average molecular weight of 2000, 19,5 parts of trifunctional polypropylene glycol having an average molecular weight of 300, 13.2 parts of neopentyl glycol and 340 parts of hexamethylenediisocyanate (HDI) were charged into a four-neck flask, equipped with a stirrer, a thermometer, a reflux condenser and a dry nitrogen gas-introducing tube and the reaction was performed in a ratio of isocyanate group equivalent/hydroxyl group equivalent of 7.7/1 at 130 ° C for 6 hours in a nitrogen gas stream. Then, unreacted 1,3-bis (isocyanate-methyl)cyclohexane in the reaction product was distilled out with a falling type film evaporator, whereby a polyisocyanate prepolymer with isocyanate group on terminal was obtained. Xylene solvent was added to the polyisocyanate prepolymer with isocyanate group on terminal thus obtained, thereby forming a uniform solution having a solid matter concentration (non-volatile matter concentration) of 90%. NCO group content, urethane group content and unreacted 1,3-bis(isocyanatemethyl)cyclohexane concentration remained in the polyisocyanate prepolymer with isocyanate group on terminal based upon 100% solid matter containing no xylene solvent were measured. The results were shown in Table 4. The viscosity of the polyisocyanate prepolymer with isocyanate group on terminal was 3000 mPa·s @ 25° C. and working efficiency was very good.

Production Example

One-liquid type moisture curing compositions composed of the following components were prepared from the polyisocyanate prepolymers with isocyanate group on terminal obtained in Examples 1 to 7 and Comparative Example 1 to 5.

Polyisocyanate prepolymer 100 parts
Dibutyltin laurate 3.6 parts
Xylene 6.4 parts The above-mentioned compositions were stirred with a dissolver and then vacuum degassed. Resin films with a uniform thickness were prepared on a releasing agent-coated glass plate of 6×300×300 (mm) with a bar coder (bar coda No. 75). The thickness of resin films thus obtained was 0.15 mm.

Curing of each resin films thus obtained was elvaluated. The results were shown in Tables 1 to 4.

Test Example

Test pieces were made from each resin films obtained in Production Example according to JIS K6301. Test pieces for measurement of tensile strength, elastic constant and elongation were based on No. 1 type.

Mechanical properties including tensile strength, elastic constant and elongation and weather resistance were evaluated for test pieces thus obtained. The results were shown in Tables 1 to 4.

The polyisocyanate prepolymer of the present invention exhibits good curing high strength, excellent mechanical properties including flexibility and elongation and excellent weather resistance.

According to the present invention, a one-liquid type moisture-curing polyisocyanate prepolymer with high security having aforementioned excellent properties is provided and industrial significance of the present invention is large since it is suitably applicable to various sealing materials, water proof agents, coating materials, coating agents, adhesives and paving materials.

TABLE 1

|  | Example 1 | Example 2 | Example 3 | Example 4 |
|---|---|---|---|---|
| NCO group content·X·1 (wt %) | 10.8 | 11.6 | 12.8 | 9.4 |
| Urethane group content·X·1 (wt %) | 12.9 | 14.7 | 15.4 | 10.6 |
| Remained organic polyisocyanate·X·2 content·X·1 (wt %) | 0.31 | 0.31 | 0.18 | 0.10 |
| Curing |  |  |  |  |
| Making situation of test piece after 5 hours of curing | ○ | ○ | ○ | ○ |
| Time until it becomes possible to make test piece (h) |  |  |  |  |
| Initial mechanical properties |  |  |  |  |
| Tensile strength (kg/cm$^2$) | 260 | 330 | 460 | 200 |
| Elastic constant (kg/cm$^2$) | 4700 | 6100 | 10000 | 3700 |
| Elongation (%) | 300 | 300 | 250 | 300 |
| Initial yellowness index YI | 0.8 | 0.9 | 0.7 | 0.8 |
| Weather resistance |  |  |  |  |
| Maintenance % of mechanical properties after 500 hours |  |  |  |  |
| Tensile strength (%) | 90 | 95 | 95 | 85 |
| Elastic constant (%) | 95 | 95 | 95 | 90 |
| Elongation (%) | 90 | 90 | 95 | 90 |
| Change of yellowness index after 500 hours Δ YI | 1.0 | 1.0 | 0.9 | 1.0 |

Note
X·1: Value based on 100% solid matter containing no xylene solvent.
X·2: 1,3-bis(isocyanatemethyl)cyclohexane.

TABLE 2

|  | Example 5 | Example 6 | Example 7 |
|---|---|---|---|
| NCO group content·X·1 (wt %) | 9.6 | 10.7 | 10.6 |
| Urethane group content·X·1 (wt %) | 11.3 | 12.2 | 13.3 |
| Remained organic polyisocyanate·X·2 content·X·1 (wt %) | 0.10 | 0.33 | 0.45 |
| Curing |  |  |  |
| Making situation of test piece after 5 hours of curing | ○ | ○ | ○ |
| Time until it becomes possible to make test piece (h) |  |  |  |
| Initial mechanical properties |  |  |  |
| Tensile strength (kg/cm$^2$) | 200 | 280 | 250 |
| Elastic constant (kg/cm$^2$) | 3000 | 5500 | 4500 |
| Elongation (%) | 250 | 300 | 300 |

TABLE 2-continued

|  | Example 5 | Example 6 | Example 7 |
|---|---|---|---|
| Initial yellowness index YI | 0.8 | 0.7 | 1.2 |
| Weather resistance Maintenance % of mechanical properties after 500 hours | | | |
| Tensile strength (%) | 85 | 95 | 85 |
| Elastic constant (%) | 90 | 95 | 80 |
| Elongation (%) | 85 | 90 | 80 |
| Change of yellowness index after 500 hours Δ YI | 1.0 | 0.9 | 2.0 |

Note
※1: Value based on 100% solid matter containing no xylene solvent.
※2: 1,3-bis(isocyanatemethyl)cyclohexane.

TABLE 3

|  | Comp. Ex. 1 | Comp. Ex. 2 | Comp. Ex. 3 |
|---|---|---|---|
| NCO group content※1 (wt %) | 7.7 | 13.4 | 11.0 |
| Urethane group content※1 (wt %) | 8.0 | 17.7 | 13.1 |
| Remained organic polyisocyanate※2 content※1 (wt %) | 0.10 | 0.27 | 0.36 |
| Curing | | | |
| Making situation of test piece after 5 hours of curing | X | Foaming | X |
| Time until it becomes possible to make test piece (h) | 10 | | |
| Initial mechanical properties | | | |
| Tensile strength (kg/cm$^2$) | 100 | | 150 |
| Elastic constant (kg/cm$^2$) | 340 | | 2500 |
| Elongation (%) | 400 | | 300 |
| Initial yellowness index YI | 0.8 | | 1.0 |
| Weather resistance Maintenance % of mechanical properties after 500 hours | | | |
| Tensile strength (%) | 65 | | 40 |
| Elastic constant (%) | 60 | | 45 |
| Elongation (%) | 70 | | 45 |
| Change of yellowness index after 500 hours Δ YI | 5.0 | | 7.0 |

Note
※1: Value based on 100% solid matter containing no xylene solvent.
※2: 1,3-bis(isocyanatemethyl)cyclohexane.

TABLE 4

|  | Comp. Ex. 4 | Comp. Ex. 5 |
|---|---|---|
| NCO group content※1 (wt %) | 10.3 | 11.0 |
| Urethane group content※1 (wt %) | 13.0 | 13.7 |
| Remained organic polyisocyanate※2 content※1 (wt %) | 0.22 | 0.22 |
| Curing | | |
| Making situation of test piece after 5 hours of curing | X | X |
| Time until it becomes possible to make test piece (h) | | |

TABLE 4-continued

|  | Comp. Ex. 4 | Comp. Ex. 5 |
|---|---|---|
| Initial mechanical properties | | |
| Tensile strength (kg/cm$^2$) | 200 | 100 |
| Elastic constant (kg/cm$^2$) | 4000 | 70 |
| Elongation (%) | 50 | 250 |
| Initial yellowness index YI | 2.0 | 1.5 |
| Weather resistance Maintenance % of mechanical properties after 500 hours | | |
| Tensile strength (%) | 30 | ※3 |
| Elastic constant (%) | 60 | ※3 |
| Elongation (%) | 10 | ※3 |
| Change of yellowness index after 500 hours Δ YI | 8.0 | 10.0 |

Note
※1: Value based on 100% solid matter containing no xylene solvent.
※2: 1,3-bis(isocyanatemethyl)cyclohexane.
※3: It was impossible to measure.

What is claimed is:

1. A polyisocyanate prepolymer with an isocyanate group on a terminal of the prepolymer obtained by the reaction of (A) polyoxyalkylenepolyol, (B) polyhydric alcohol and (C) organic polyisocyanate, said polyisocyanate prepolymer having:

(1) NCO group content in the polyisocyanate prepolymer is 8% by weight or above and urethane group content in the polyisocyanate prepolymer is 8% by weight or above and sum total of NCO group content and urethane group content is 16 to 30% by weight, (2) (B) polyhydric alcohol has a molecular weight of 90 to 250 and 2 to 3 hydroxyl groups and the polyhydric alcohol is an alcohol with branched alkyl group and/or cyclohexane ring, (3) (C) organic polyisocyanate is bis(isocyanatemethyl) cyclohexane, and (4) a concentration of unreacted (C) organic polyisocyanate remaining in the polyisocyanate prepolymer is 1% by weight or below.

2. A polyisocyanate prepolymer according to claim 1, wherein (B) polyhydric alcohol is neopentyl glycol, cyclohexane dimethanol or a mixture thereof.

3. A polyisocyanate prepolymer according to claim 1, wherein (C) organic polyisocyanate is bis (isocyanatemethyl) cyclohexane which does not substantially contain halogen.

4. A polyisocyanate prepolymer according to claim 1, wherein a ratio of isocyanate group equivalent/hydroxyl group equivalent in the reaction of (A) polyoxyalkylenepolyol, (B) polyhydric alcohol and (C) organic polyisocyanate is 2/1 to 50/1.

* * * * *